United States Patent
Cho et al.

(10) Patent No.: US 10,528,760 B2
(45) Date of Patent: Jan. 7, 2020

(54) PRIVACY-PRESERVING MULTI-CLIENT AND CLOUD COMPUTATION WITH APPLICATION TO SECURE NAVIGATION

(71) Applicant: HRL Laboratories, LLC, Malibu, CA (US)

(72) Inventors: Chongwon Cho, Los Angeles, CA (US); Karim El Defrawy, Santa Monica, CA (US); Hyun (Tiffany) J. Kim, Irvine, CA (US); Joshua D. Lampkins, Gardena, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/046,016

(22) Filed: Jul. 26, 2018

(65) Prior Publication Data

US 2019/0042788 A1    Feb. 7, 2019

Related U.S. Application Data

(60) Provisional application No. 62/541,013, filed on Aug. 3, 2017.

(51) Int. Cl.
*G06F 21/62* (2013.01)
*G06F 16/29* (2019.01)
(Continued)

(52) U.S. Cl.
CPC .......... *G06F 21/6245* (2013.01); *G06F 16/29* (2019.01); *G01C 21/3453* (2013.01); *G01C 21/3691* (2013.01)

(58) Field of Classification Search
CPC . G06F 16/29; G06F 21/6245; G01C 21/3453; G01C 21/3691
See application file for complete search history.

(56) References Cited

U.S. PATENT DOCUMENTS 9,536,114 B1    1/2017 El Defrawy et al.
2011/0040820 A1    2/2011 Rane et al.
(Continued)

FOREIGN PATENT DOCUMENTS

WO    WO2017-115342 A1    7/2017

OTHER PUBLICATIONS

Olariu et al., "The Next Paradigm Shift: From Vehicular Networks to Vehicular Clouds", pp. 645-700 (Year: 2013).*

(Continued)

*Primary Examiner* — Thaddeus J Plecha
(74) *Attorney, Agent, or Firm* — Tope-McKay & Associates

(57) ABSTRACT

Described is a system for cloud-based privacy-preserving navigation operations between multiple parties. The system performs a two-party computation (2PC) between input data related to a current location of a first party and public data stored on a cloud computing infrastructure. Each party individually performs a 2PC on the public data while maintaining privacy of their input data. The system then performs multi-party computations (MPC) between multiple parties and the cloud computing infrastructure. The multiple parties privately update the public data with a result obtained from the 2PC. For the first party, a privacy-preserved navigation result is generated using results obtained from the 2PC and the MPC. The first party is caused to perform a navigation operation based on the privacy-preserved navigation result.

19 Claims, 13 Drawing Sheets

(51) Int. Cl.
  *G01C 21/34* (2006.01)
  *G01C 21/36* (2006.01)

(56) References Cited

U.S. PATENT DOCUMENTS

| | | | |
|---|---|---|---|
| 2012/0185946 A1 | 7/2012 | Kamara et al. | |
| 2012/0233460 A1* | 9/2012 | Kamara | H04L 9/3218 713/168 |
| 2014/0372753 A1* | 12/2014 | DeCristofaro | G06F 21/6245 713/167 |
| 2016/0156460 A1* | 6/2016 | Feng | H04L 9/008 713/168 |

OTHER PUBLICATIONS

Pullonen et al., "Combining Secret Sharing and Garbled Circuits for Efficient Private IEEE 754 Floating-Point Computations", 20 pages (Year: 2015).*

Yan Huang, David Evans, Jonathan Katz, and Lior Malka. Faster Secure Two-Party Computation Using Garbled Circuits, 20th USENIX Security Symposium, San Francisco, CA. Aug. 8-12, 2011, pp. 1-16.

Andrew C. Yao. 1982. Protocols for secure computations. In Proceedings of the 23rd Annual Symposium on Foundations of Computer Science (SFCS '82). IEEE Computer Society, Washington, DC, USA, pp. 160-164. DOI=10.1109/SFCS.1982.88 http://dx.doi.org/10.1109/SFCS.1982.88.

R. Canetti. 2001. Universally Composable Security: A New Paradigm for Cryptographic Protocols. In Proceedings of the 42nd IEEE symposium on Foundations of Computer Science (FOCS '01). IEEE Computer Society, Washington, DC, USA, pp. 1-10.

O. Goldreich. 2004. Foundations of Cryptography: vol. 2, Basic Applications. Cambridge University Press. New York, NY, USA, Chapter 7, pp. 602 and 603.

Daniel Demmler, Thomas Schneider, and Michael Zohner. "ABY—a framework for efficient mixed-protocol secure two-party computation." In 21st Annual Network and Distributed System Security Symposium (NDSS'15). The Internet Society, Feb. 8-11, 2015, pp. 1-15.

T.W. Chim, S. M. Yiu, C. K. Hui, and V. O. K. Li. VSPN: VANET-based Secure and Privacy-preserving Navigation. In IEEE Transactions on Computers, Feb. 2014, 63(2), pp. 510-524.

Notification of Transmittal of International Search Report and the Written Opinion of the International Searching Authority for PCT/US2018/043850; dated Nov. 26, 2018.

International Search Report of the International Searching Authority for PCT/US2018/043850; dated Nov. 26, 2018.

Written Opinion of the International Searching Authority for PCT/US2018/043850; dated Nov. 26, 2018.

* cited by examiner

| Input Size (bits) | 256 | | 512 | | 1024 | | 2048 | |
|---|---|---|---|---|---|---|---|---|
| | Vehicle | Cloud | Vehicle | Cloud | Vehicle | Cloud | Vehicle | Cloud |
| Preparation Time (msec) | 902 | 1774 | 962 | 1837 | 1089 | 1968 | 1220 | 2095 |
| Execution Time (msec) | 569 | 564 | 733 | 668 | 1149 | 1148 | 1400 | 1408 |
| No. And Gates | 2566 | | 5126 | | 10246 | | 20486 | |
| No. Or Gates | 2818 | | 5634 | | 11266 | | 22530 | |
| No. Xor Gates | 4872 | | 9736 | | 19464 | | 38920 | |

FIG. 7

| Number of Nodes (n) | Precomputation Time (sec) | Online Computation Time (sec) | Number of Messages Communicated | Number of Bytes Communicated |
|---|---|---|---|---|
| 8 | 0.064 | 0.088 | 147 | 8*10374=83KB |
| 16 | 0.162 | 0.397 | 292 | 16*20573=329KB |
| 32 | 02.000 | 2.175 | 591 | 32*41620=1.3MB |
| 64 | 11.820 | 13.163 | 1124 | 64*79034=5.1MB |

FIG. 8

PRIVACY-PRESERVING MULTI-CLIENT AND CLOUD COMPUTATION WITH APPLICATION TO SECURE NAVIGATION

CROSS-REFERENCE TO RELATED APPLICATIONS

This is a Non-Provisional patent application of U.S. Provisional Application No. 62/541,013, filed in the United States on Aug. 3, 2017, entitled, "Privacy-Preserving Multi-Client and Cloud Computation with Application to Secure Navigation," the entirety of which is hereby incorporated by reference.

BACKGROUND OF INVENTION

(1) Field of Invention

The present invention relates to a cloud-based system for planning, scheduling, and resource allocation tasks and, more particularly, to a cloud-based system for planning, scheduling, and resource allocation tasks while preserving privacy.

(2) Description of Related Art

Secure multi-party computation (MPC) itself involves computationally expensive steps, such as multiplications of values shared among multiple nodes. Hence, any privacy-preserving solution based on MPC alone would be impractical, because such a solution has to involve tens, hundreds, or thousands of parties. Current MPC techniques have a very high communication and computation overhead and, thus, typically work with less than 10 parties. For the purposes of this invention, a party can be a person, a vehicle, or any mobile computing device.

Typically, existing work either focuses on developing and optimizing secure two-party computation (2PC) algorithms and techniques between a party/user/device and the cloud or any other party/user/device (such as described in Literature Reference No. 1 of the List of Incorporated Literature References). There are also other efforts to design frameworks that combine 2PC based on garbled circuits and arithmetic computation, such as described in Literature Reference No. 5. These efforts only target two parties and not multi-parties. One cannot trivially generalize and extend the work in Literature Reference No. 5 to the multi-party case, since the underlying mechanisms cannot be extended as is to more than two parties.

Regarding secure navigation, Chim et al. (see Literature Reference No. 6) proposed a privacy-preserving navigation system that utilizes re-encryption cryptosystems and the vehicular ad-hoc network (VANET) infrastructure to provide the real-time optimal route service. More specifically, their system relies heavily on (1) Trusted Authorities (TA) that generate public-private key pairs for vehicles and re-encryption keys that can be distributed to untrusted entities for relaying system-wide master secrets to vehicles that are properly registered and subscribed (e.g., with payments) to the navigation service; and (2) an untrusted infrastructure called Road Side Units (RSU) that tracks up-to-date route/traffic information in their own zones.

For privacy, TA provides anonymous credentials to vehicles. To use the navigation system, a vehicle uses one of its anonymous credentials and contacts a nearby RSU (RSUs), which broadcasts the request to other RSUs until the RSU governing the destination (RSUD) is reached. Then, each RSU on the path to the vehicle's intended destination provides a certified optimal route (e.g., minimum time or minimum turns signed by that RSU) and guides the vehicle in the RSU's zone, until the vehicle reaches the destination. Unfortunately, their system heavily relies on tamper-proof hardware on vehicles to verify RSU responses using asymmetric cryptography and is vulnerable to flooding attacks, since RSUs must broadcast queries for every route request. Furthermore, RSUs may suffer from delayed road condition reports, since their system does not leverage information from vehicles on the road.

Thus, a continuing need exists for a system that uses MPC only for very simple and lightweight updates so that MPC can be effectively performed for a large number of parties.

SUMMARY OF INVENTION

The present invention relates to a cloud-based system for planning, scheduling, and resource allocation tasks and, more particularly, to a cloud-based system for planning, scheduling, and resource allocation tasks while preserving privacy. The system comprises one or more processors and a non-transitory computer-readable medium having executable instructions encoded thereon such that when executed, the one or more processors perform multiple operations. The system performs a two-party computation (2PC) between input data related to a current location of a first party and public data stored on a cloud computing infrastructure, wherein each party individually performs a 2PC on the public data while maintaining privacy of their input data. The system then performs multi-party computations (MPC) between multiple parties and the cloud computing infrastructure, where the multiple parties privately update the public data with a result obtained from the 2PC. For the first party, the system generates a privacy-preserved navigation result from the first party's current location to a desired end location using results obtained from the 2PC and the MPC. The first party is caused to perform a navigation operation based on the individual privacy-preserved navigation result.

In another aspect, the system performs the 2PC between input data from a vehicle and the cloud computing infrastructure for generating a route from the current location of the vehicle to the desired end location, wherein the current location, the desired end location, and the route from the current location to the desired end location are not revealed to the cloud computing infrastructure.

In another aspect, the public data is a cloud-based map, and the system performs privacy-preserving updates to the cloud-based map using MPC between the multiple parties.

In another aspect, during the 2PC, each party learns which party or parties it should engage with in the MPC.

In another aspect, the system generates a cloud-based map for display on a mobile device associated with the party, wherein the cloud-based map displays the 1 privacy-preserved navigation result of the party, and the privacy-preserved navigation result is not revealed to the cloud computing infrastructure.

In another aspect, the public data comprises current traffic conditions, and wherein the MPC is used to update current traffic conditions in the public data.

In another aspect, the navigation operation is a vehicle maneuver.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7 is a table illustrating required times of computing navigation circuits with various input sizes according to some embodiments of the present disclosure;

FIG. 8 is a table illustrating required pre-computation and online times of computing multi-party computing (MPC) circuits according to some embodiments of the present disclosure;

DETAILED DESCRIPTION

Figure 1:
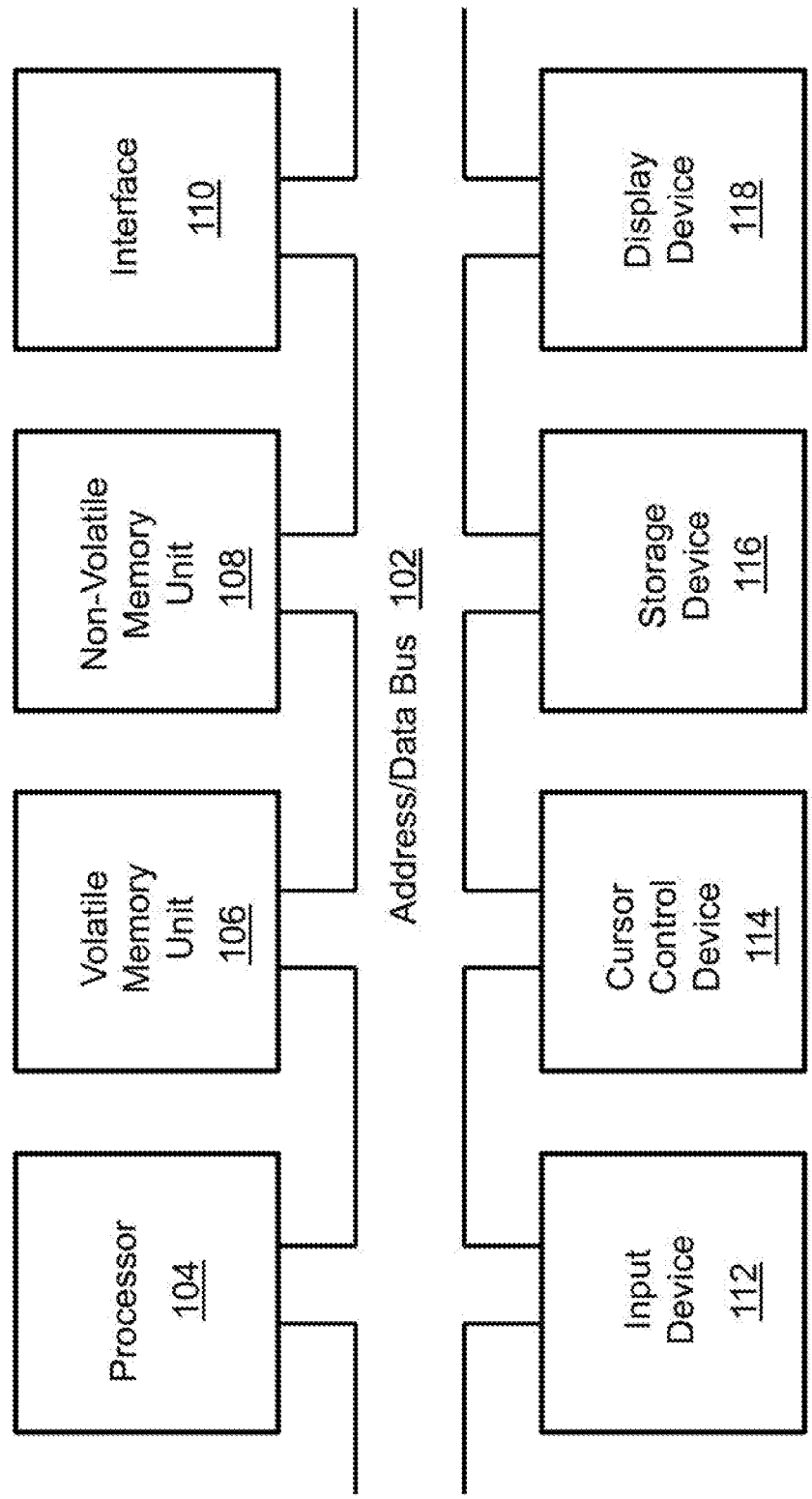
FIG. 1 is a block diagram depicting the components of a cloud-based system for planning, scheduling, and resource allocation tasks according to some embodiments of the present disclosure.

The present invention relates to a cloud-based system for planning, scheduling, and resource allocation tasks and, more particularly, to a cloud-based system for planning, scheduling, and resource allocation tasks while preserving privacy. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Yan Huang, David Evans, Jonathan Katz, and Lior Malka. Faster Secure Two-Party Computation Using Garbled Circuits, 20th USENIX Security Symposium, San Francisco, Calif. 8-12 Aug. 2011.
2. Andrew C. Yao. 1982. Protocols for secure computations. In Proceedings of the 23rd Annual Symposium on Foundations of Computer Science (SFCS '82). IEEE Computer Society, Washington, D.C., USA, 160-164.
3. R. Canetti. 2001. Universally Composable Security: A New Paradigm for Cryptographic Protocols. In Proceedings of the 42nd IEEE symposium on Foundations of Computer Science (FOCS '01). IEEE Computer Society, Washington, D.C., USA, 136.
4. O. Goldreich. 2004. Foundations of Cryptography: Volume 2, Basic Applications. Cambridge University Press. New York, N.Y., USA, Chapter 7.

5. Daniel Demmler, Thomas Schneider, and Michael Zohner. "ABY—a framework for efficient mixed-protocol secure two-party computation." In 21st Annual Network and Distributed System Security Symposium (NDSS '15). The Internet Society, Feb. 8-11, 2015.
6. T. W. Chim, S. M. Yiu, C. K. Hui, and V. O. K. Li. VSPN: VANET-based Secure and Privacy-preserving Navigation. In IEEE Transactions on Computers, February 2014, 63(2), p 510-524.

(2) Principal Aspects

Various embodiments of the invention include three "principal" aspects. The first is a cloud-based system for planning, scheduling, and resource allocation tasks. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM ("EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
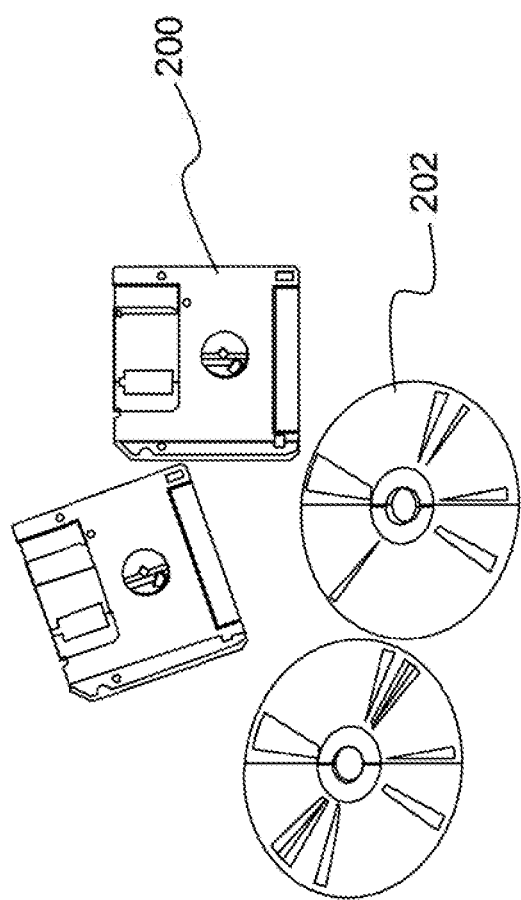
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is a cloud-based system and methods to perform privacy-preserving operations for planning, scheduling, or resource allocation tasks (i.e., performing computation to determine a certain sequence of steps to be performed by the user (or a machine) while preserving privacy, or allocation or matching of resources). The task is to be performed given (1) user's privacy-sensitive input specifically relevant to the operations, and (2) inputs from crowds or the public to update the service environment, while the cloud learns nothing about the user's and crowds' sensitive inputs. The combination of secure two-party computation (2PC) and multi-party computation (MPC) techniques result in a lightweight and efficient/practical system that provides efficiency in computational and communication overhead, such that users experience tolerable amount of delay (on the order of seconds) to receive service while preserving their privacy.

Figure 12:
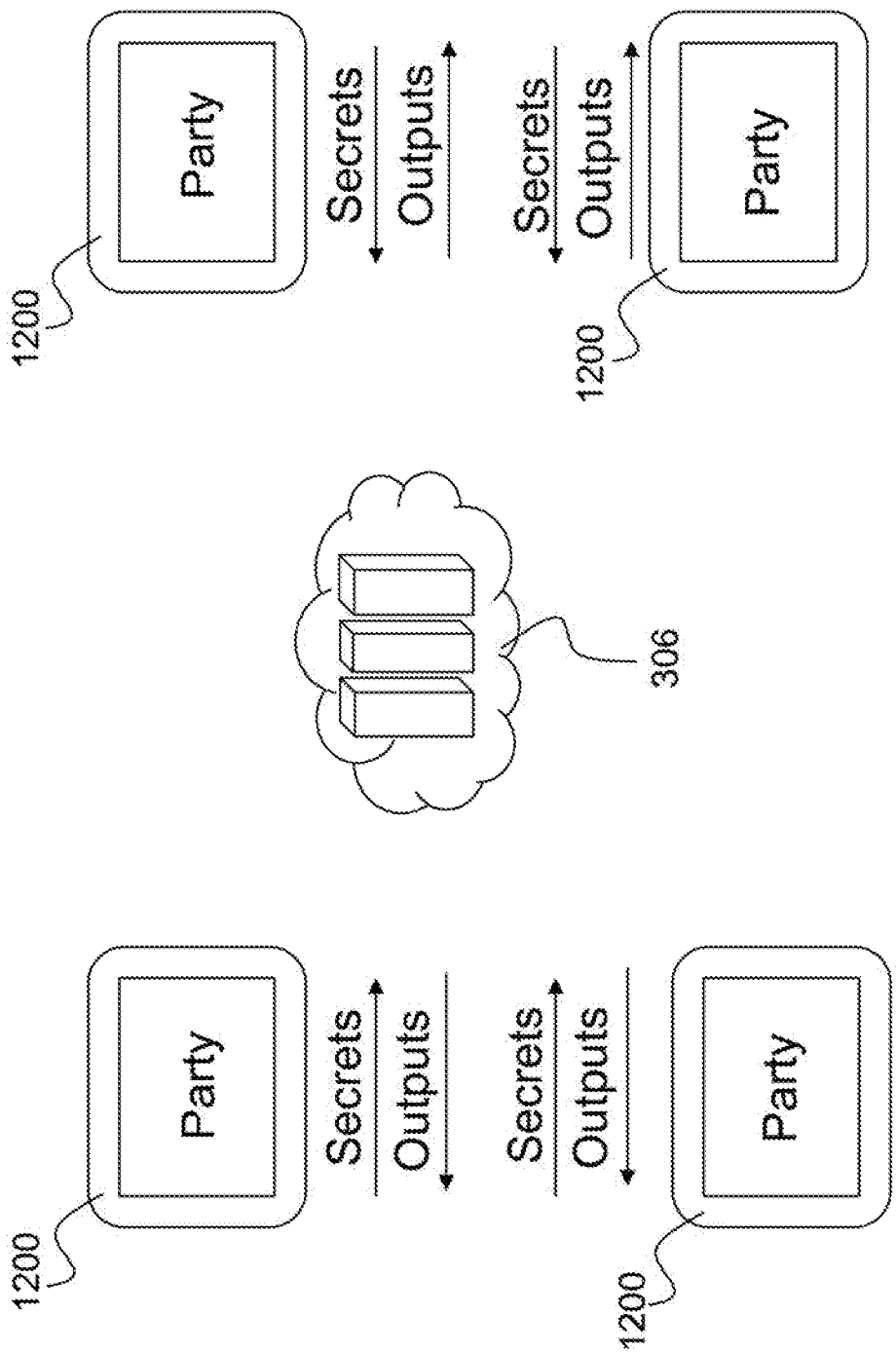
FIG. 12 is an illustration of multi-party computation according to some embodiments of the present disclosure.

Secure multi-party computation (MPC) itself involves computationally expensive steps, such as multiplications of values shared among multiple nodes. The goal of MPC is to jointly compute a function over the parties'/nodes' inputs while keeping those inputs private. Hence, any privacy-preserving solution based on MPC alone would be impractical, because such a solution has to involve 10s or 100s or 1000s of parties, and current MPC techniques have a very high communication and computation overhead and, thus, typically work only with less than 10 parties. FIG. 12 illustrates an example of MPC between a plurality of parties 1200 (e.g., computing devices, vehicles) and the cloud 306, where the parties 1200 share secret data, and the cloud 306 returns outputs. None of the parties 1200 learn anything more about the other parties' 1200 secret data than they could learn from their own inputs and the output of the cloud 306.

Figure 13:
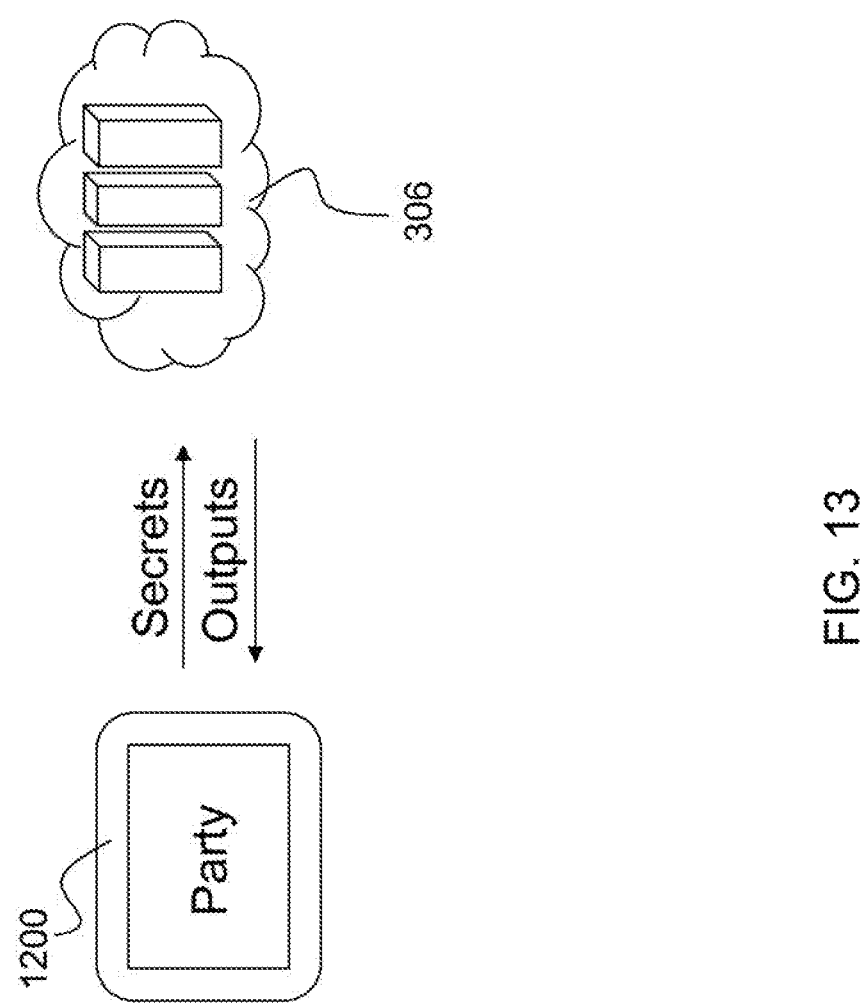
FIG. 13 is an illustration of two-party computation according to some embodiments of the present disclosure.

In the system according to embodiments of the present disclosure, MPC is used only for very simple and lightweight updates (e.g., to update the final collective traffic conditions, and empty parking lot spaces after each party has computed its function with the cloud in a privacy-preserving manner using two-party computation (2PC)) so that this can be effectively performed for a large number of parties. The goal of 2PC is to create a protocol that allows two parties to jointly compute an arbitrary function on their inputs without sharing the value of their inputs with the opposing party. FIG. 13 illustrates an example of 2PC between a party 1200 (e.g., computing device, vehicle) and the cloud 306. Note that efficient and practical 2PC between each party 1200 and the cloud 306 is used for the actual calculation of optimal paths or to find empty parking lot spaces. This two-step process in the system described herein results in realistic, practical performance overhead that current vehicles and clouds can tolerate without sacrificing usability.

The system and methods disclosed herein enable privacy-preserving computation using a cloud-based backend. Specifically, the setting considered is one where multiple parties want to perform certain computation for planning or resource allocation purposes (generally compute a function) using a public database (or data structures) held by a cloud system, server, or set of servers.

Figure 3:
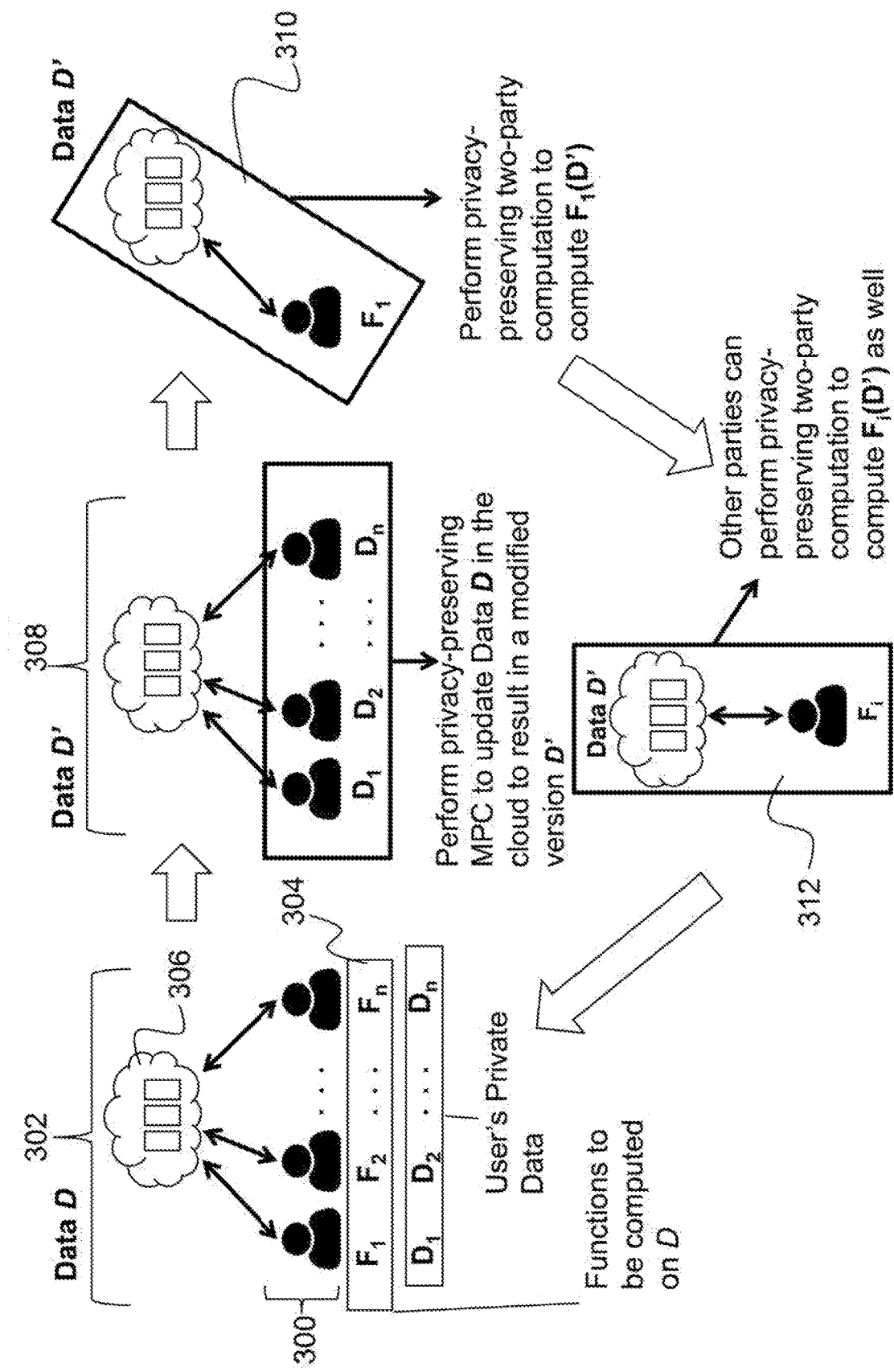
FIG. 3 is an illustration of an overview of operation of a cloud-based system for planning, scheduling, and resource allocation tasks according to some embodiments of the present disclosure.

FIG. 3 depicts an overview of the operation in the system described herein, a set of users 300 each have their private data ($D_i$) 302 (collectively referred to as Data D) and would like to compute certain functions ($F_i$) 304 using their private data and some public data ($D_j$) on the cloud 306. The system performs privacy-preserving MPC to update Data D in the cloud to result in a modified version D' 308. User's continuously update the public data on the cloud using MPC. Each user computes $F_i(D')$ privately using their input 310. Other parties can perform privacy-preserving two-party computation to compute $F_i(D')$ as well 312.

Once parties perform their computations and get their individual results, the cloud's data should be updated to reflect each party's result. More specifically, the design describes a cloud-based system and methods to perform privacy-preserving operations for some service to users/parties given (1) (Step 1) their privacy-sensitive input that is specifically relevant to the operation or function being computed and (2) (Step 2) inputs from other parties or crowds (or any other third parties) to update the service environment, while ensuring that the cloud learns nothing about each party's sensitive inputs.

Figure 4:
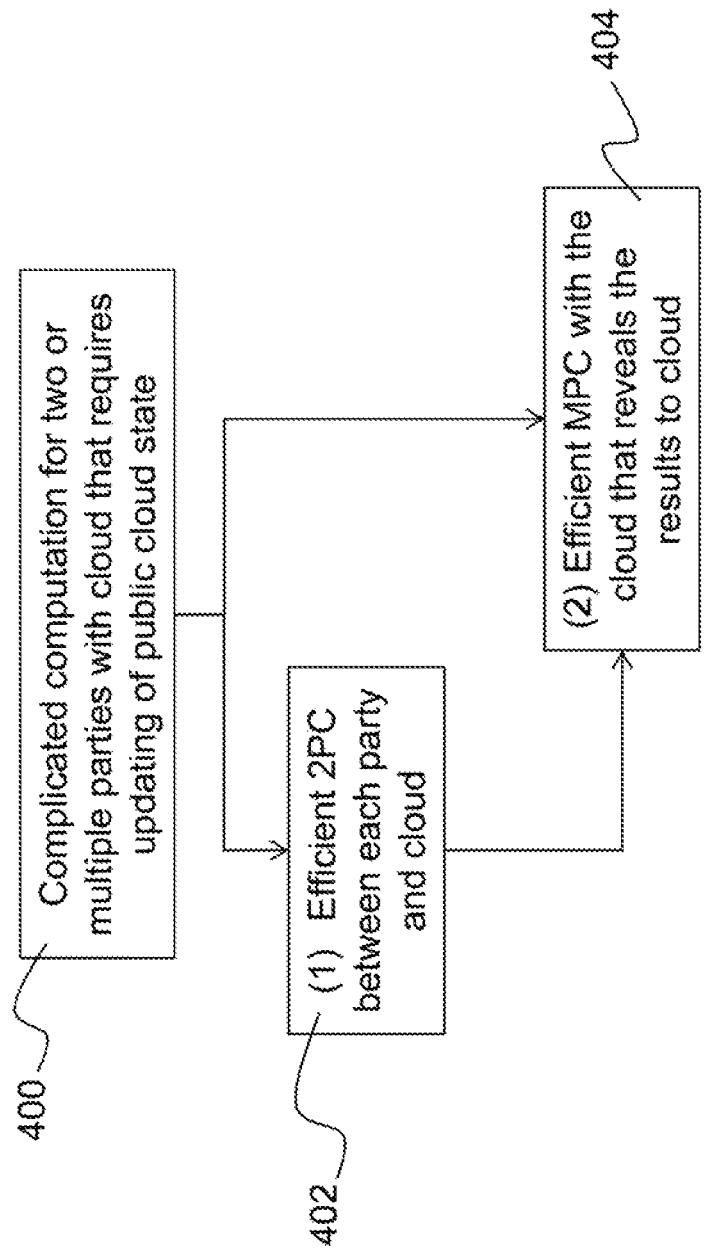
FIG. 4 is an illustration of a computation between multiple parties and the cloud according to some embodiments of the present disclosure.

As described above, the combination of secure two-party computation (2PC) and multi-party computation (MPC) results in a lightweight system that provides practical performance and efficiency in computational overhead such that users experience a tolerable amount of delay (on the order of seconds) and only require practical computation on their side to receive the desired service while preserving their privacy. The system according to embodiments of the present disclosure performs Step (1) using any 2PC techniques (one such example is Literature Reference No. 1) (element 402) and Step (2) using any MPC technique with certain properties (element 404). FIG. 4 depicts the breakdown of a complicated computation between multiple parties and the cloud (element 400) into two steps. The first step 402 uses 2PC between each party and the cloud (element 402), and the second step 404 uses MPC between the parties to update the cloud's data.

Figure 5:
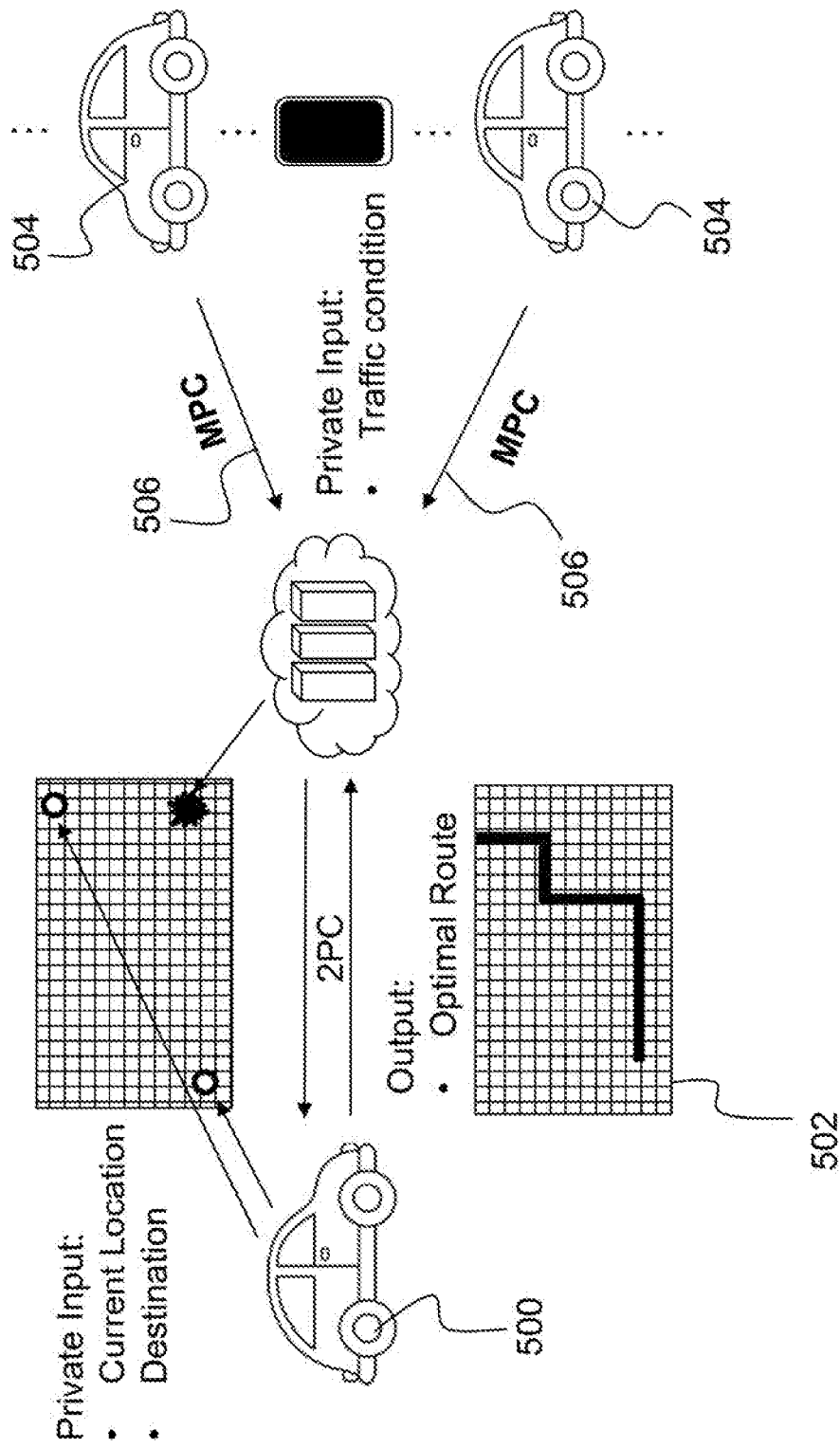
FIG. 5 is an illustration of preserving drivers' location and destination privacy in a connected vehicle navigation system according to some embodiments of the present disclosure.

FIG. 5 depicts preserving drivers' location and destination privacy in a connected vehicle navigation system. The 2PC configuration ensures that the cloud learns no information about the vehicle's 500 current location, destination, and computed route, while returning the route and the map (element 502) to the driver. To update the traffic conditions, vehicles 504 engage in a lightweight MPC 506 that can scale to 100s or more nodes (e.g., vehicles) while ensuring privacy protection for a large number of users collectively.

In summary, the invention described herein breaks down a complicated computation between multiple parties and the cloud into the following two steps:

(i) A pairwise privacy-preserving computation between each individual party and the cloud that results in the party obtaining its required result and learning which parties it then should engage in an MPC computation with to update the cloud state. 2PC between each party and the cloud provides as output to the party a list of other parties to engage in MPC with.

(ii) A lightweight privacy-preserving computation between multiple parties that takes each party's input as the output of the previous step and collectively computes an overall result that should be applied to the cloud's public data (e.g., update the traffic conditions on the map in the case of privacy-preserving navigation).

(3.1) Privacy-Preserving Navigation in the Automotive Domain

Applications of the invention according to embodiments of the present disclosure are described within the context of performing privacy-preserving navigation in the automotive setting. However, as can be appreciated by one skilled in the art, the system and method described herein are generic and can perform a wide set of other computations and applications. A cloud-assisted vehicular (or pedestrian, or navigation for any manned or unmanned platform) navigation system is a setting where a cloud computing infrastructure (or servers operated by an operator) maintains and stores up-to-date map information and states, such as routes and paths, road and traffic conditions, and/or other map (or terrain) information collected from various resources. Non-limiting examples of various resources include roadside cameras, inputs from other drivers or dedicated/authoritative observers using the vehicular communication systems or their mobile devices, sensors on vehicles or smartphones, or any other devices. This cloud system can be queried by users and provides the path information to users to navigate from a source to a destination location using publicly available maps (e.g., Google Maps, Apple Maps, Waze). The system can then be used to cause an autonomous vehicle to navigate or traverse the path to the destination location.

An additional example application for the invention is building a cloud-assisted parking structure, where the cloud maintains and learns empty parking lot spaces from various resources (e.g., vehicles that are leaving, passing-by vehicles that observe empty lots, parking infrastructure sensors that detect occupied spaces) and provides the location of the empty parking space that is nearest to the incoming driver's destination. In some embodiments, the system can then be used to cause an autonomous vehicle to navigate or otherwise drive to and park in the empty parking space. The privacy-preserving aspects of the system guarantee that the cloud learns nothing about the driver's current location, intended destination, computed route(s), or user's route/parking preferences.

To see the drawbacks of a naïve approach for a navigation system, consider the following scenario. User Alice in a connected automotive system with some localization mechanism, such as GPS, utilizes a cloud-based navigation platform without revealing her current location and/or destination. Her automotive system can download the entire city map at once with the latest traffic and road conditions from the cloud navigation platform, such that the vehicle computes the route locally without further interaction with the cloud platform. However, if all vehicles, including Alice's, perform computations locally without updating the cloud navigation platform (such as traffic conditions), information related to the map quickly become outdated.

In contrast to the method above, the system according to embodiments of the present disclosure utilizes 2PC and MPC in tandem to address location privacy and privacy-preserving updates to the map while obtaining realistic performance despite complex computations. Specifically, users first obtain portions of the map corresponding to their origin, destination, and possible routes using 2PC such that the location-relevant private information of vehicles is not revealed to the cloud. To update traffic conditions, vehicles engage in lightweight MPC that can scale to 10s, or more, vehicles while ensuring privacy protection for a large number of users collectively. Since the complexity of MPC increases as the number of parties engaged in the MPC protocol increases, using 2PC to find a relatively small number of vehicles to execute an MPC protocol is much more efficient than executing a MPC protocol with all other vehicles. It is possible to manually design a privacy-preserving function-specific protocol to achieve the above in months or weeks; however, the design of the protocol described herein uses a circuit that would only take days. In addition, the system provides the expendability to other privacy-preserving functionalities, not bound to the privacy-preserving secure navigation system. Initial performance results demonstrate the feasibility and practicality of the privacy-preserving navigation system according to embodiments of the present disclosure using 2PC and MPC.

As a non-limiting example of application of the invention described herein, a user in a connected automotive system with some localization mechanism, such as global positioning system (GPS), wants to utilize a cloud-based platform for navigation without revealing her current location and/or destination (illustration in FIG. 5). A trivial solution to achieve this is to download the map of the entire city (or country) with the latest traffic and road conditions, such that the vehicle computes the route locally. However, if vehicles perform computations locally without updating the cloud, traffic conditions on the map quickly become outdated.

Alternatively, one can imagine a (brute force) solution using MPC such that every vehicle on the road interacts with this cloud-based service and other vehicles using MPC to compute routes and update the map. While possible in theory, such a solution would have to involve thousands of vehicles. In addition, the computation would be complex and performance would be very impractical. By utilizing the invention disclosed herein, which performs 2PC and MPC in tandem, one can address both issues of location privacy and privacy-preserving updates to the map, obtaining realistic performance with complex computations.

Specifically, users and vehicles first privately obtain portions of the map corresponding to their origin, destination, and possible routes using 2PC (see section (3.1.1) below) such that those positions are not revealed to the cloud (an example of how to achieve this is shown in FIG. 5). To update traffic conditions, vehicles engage in lightweight MPC that can scale to 10s or more nodes while ensuring privacy protection for a large number of users collectively. While one can manually design a privacy-preserving function-specific protocol to achieve the above in months or weeks, a 2PC circuit would only take days using a system, such as disclosed in Literature Reference No. 1.

(3.1.1) Description of the 2PC Computation for Privacy-Preserving Navigation The 2PC portion and, thus, the circuit to be computed assumes the roads follow a rectangular grid. The client provides its starting and ending position/location as private inputs, and the server provides the location of a point that the client must avoid as a private input (see FIG. 6 for an illustration). The x- and y-coordinates of the client's starting position are denoted 600; the x- and y-coordinates of the client's ending position are denoted 602; the x- and y-coordinates of the avoidance point provided by the server are denoted 604. The variables diffx and diffy store the horizontal and vertical distance between the client's starting location and destination.

Each of six possible paths between the start and end point is computed. Namely, the client either moves vertically directly to its destination; diverts itself one unit to the right, moves vertically to its destination, and then moves one unit to the left (in the case that the avoidance point is on the vertical path between the client and its destination); moves horizontally directly to its destination; diverts itself one unit upward, moves horizontally to its destination, and then moves one unit to downward (in the case that the avoidance point is on the horizontal path between the client and its destination); moves vertically and then horizontally; or moves horizontally and then vertically. Each possible path is broken down into three separate pieces, even though some of these pieces may have zero distance. For instance, verticalPath1 is represented by the three variables verticalPath1p1, verticalPath1p2, and verticalPath1p3. Each direction vector is a 33-bit variable; the first bit represents direction (0 for horizontal, 1 for vertical), and the next 32 bits are the signed number that represents the distance traveled. The variable minus1 holds the 32-bit representation of negative 1.

After providing inputs and computing diffx and diffy, the circuit constructs each of the three pieces of each of the six possible paths. Then, it selects which path will be used. If the client's starting and ending locations are on the same horizontal (resp. vertical) line, then the 1-bit variable pickHorizontal (resp. pickVertical) is set to true. The 1-bit variable pickDiagonal is set to be the negation of the binary or of pickHorizontal and pickVertical, so that pickDiagonal is only true of both pickHorizontal and pickVertical are false. The 1-bit variable avoidHorizontal (resp. avoidVertical) is set to true if the avoidance point is on the same horizontal (resp. vertical) line as the starting location of the client.

Figure 10:
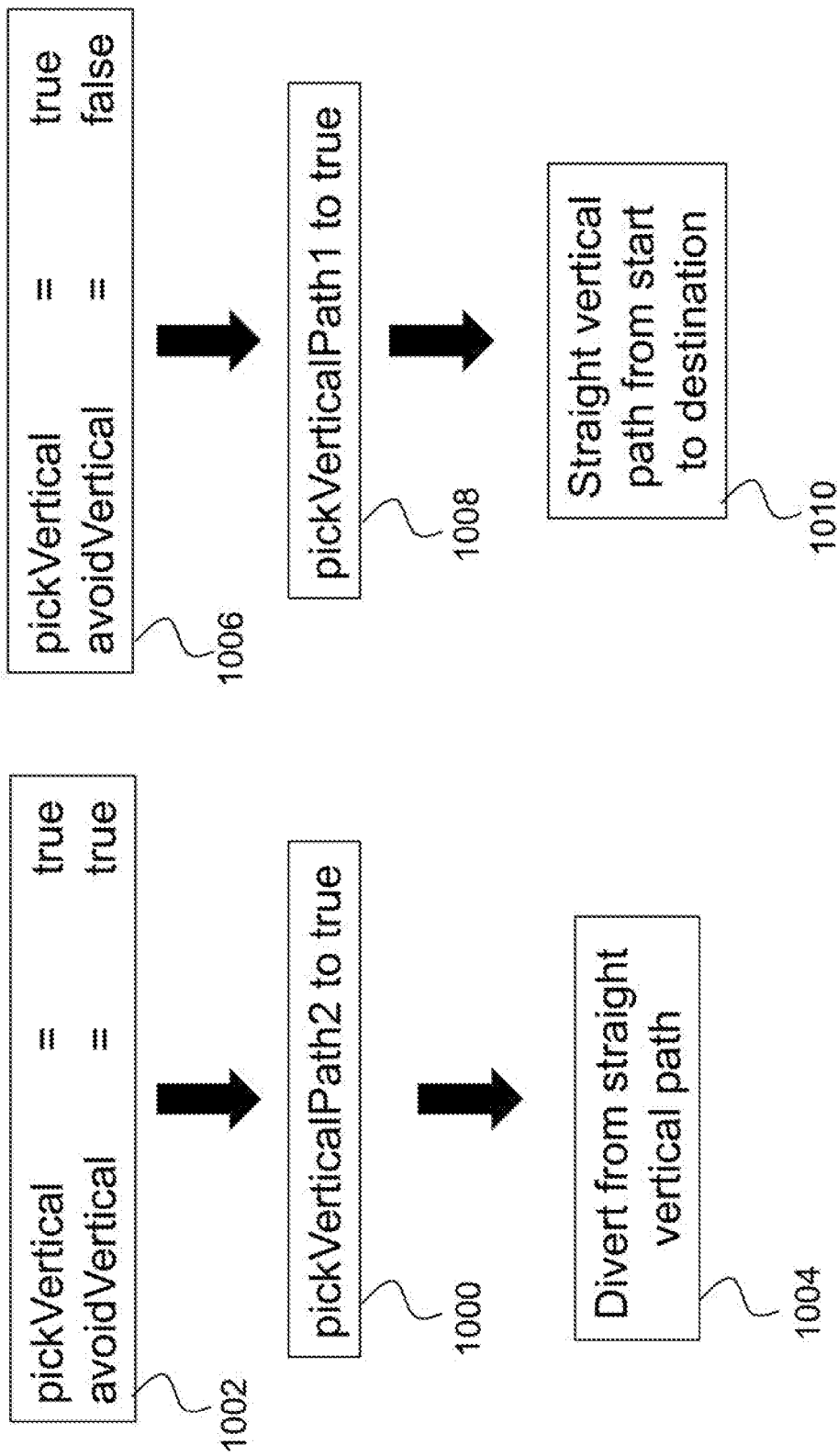
FIG. 10A is an illustration of selection of a path which diverts from a straight vertical path according to some embodiments of the present disclosure.
FIG. 10B is an illustration of selection of a vertical path from a starting point to a destination according to some embodiments of the present disclosure.

As shown in FIG. 10A, the 1-bit variable pickVerticalPath2 is set to true (element 1000) if both pickVertical and avoidVertical are true (element 1002), meaning that the client needs to divert from a straight vertical path (element 1004). As shown in FIG. 10B, if pickVertical is true and avoidVertical is false (element 1006), then pickVerticalPath1 is set to true (element 1008), so that the client takes a straight vertical path from start to destination (element 1010). The variables pickHorizontalPath1, pickHorizontalPath2, pickDiagonalPath1, and pickDiagonalPath2 are similarly defined so that the client selects the appropriate path to its destination while avoiding the point input by the server. In this way, only one of these six variables is true, while the others are false.

Through a series of successive concatenations, each of these 1-bit variables is extended into a 33-bit variable. For example, pickVerticalPath1 is concatenated into pvp1l33, so that if pickVerticalPath1 is 1 (true), then pvp1l33 is a sequence of 33 1's, and if pickVerticalPath1 is 0 (false), then pvp1l33 is a sequence of 33 0's.

The path temp11 is set to be (pvp1l33 and verticalPath1) or (pvp2l33 and verticalPath2) or (php1l33 horizontalPath1) or (php2l33 horizontalPath2) or (pdp1l33 diagonalPath1) or (pdp2l33 diagonalPath2). In this way, the appropriate path is selected. This is done for each of the three variables temp11p1, temp11p2, and temp11p3 individually through a sequence of successive binary and/or operations. The final output variables, path1direction, path1length, path2direction, path2length, path3direction, and path3length are defined by selecting the first bit (representing direction) and the remaining 32 bits (representing length/distance) from each of the temp11p1, temp11p2, and temp11p3.

Figure 6A:
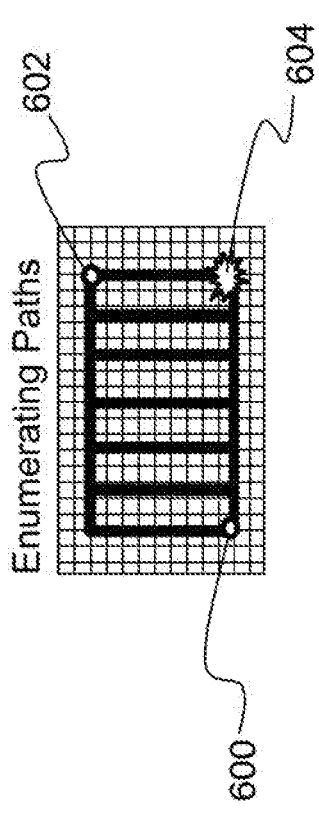
FIG. 6A is an illustration of possible paths from a vehicle's current location to a destination according to some embodiments of the present disclosure.
Figure 6B:
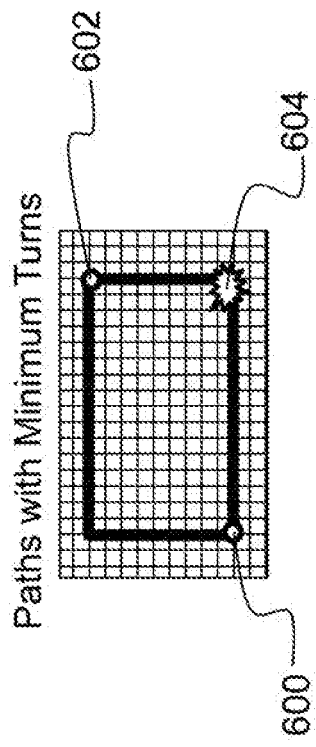
FIG. 6B is an illustration of paths with minimum turns according to some embodiments of the present disclosure.
Figure 6C:
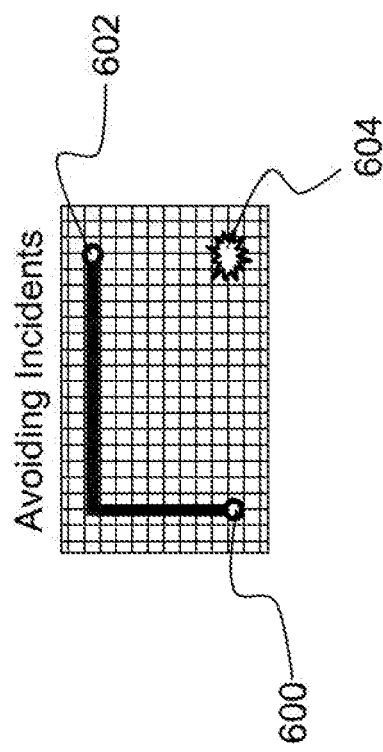
FIG. 6C is an illustration of paths avoiding incidents according to some embodiments of the present disclosure.

FIG. 6A is an illustration of possible paths from a vehicle's current location to a destination. FIG. 6B depicts paths with minimum turns, and FIG. 6C illustrates paths avoiding incidents. There are several possible paths (FIG. 6A) from a vehicle's current location 600 to the destination 602. The incident location 604 indicates an incident to avoid and is known to the cloud, but is not to be revealed to the vehicle. The 2PC circuit selects the path with minimal number of turns (FIG. 6B), then the one that avoids the incident location 604 (FIG. 6C).

(3.1.2) Sample 2PC Computation (Circuit) Description

The following description used the software described in Literature Reference No. 1.

```
.input startx 1 32
.input starty 1 32
.input endx 1 32
.input endy 1 32
.input avoidx 2 32
.input avoidy 2 32
diffx sub endx startx
diffy sub endy starty
minus1 negate 1:32
verticalPath1p1 concat 0:33
verticalPath1p2 concat 0:1 diffy
verticalPath1p3 concat 0:33
verticalPath2p1 concat 1:1 1:32
verticalPath2p2 concat 0:1 diffy
verticalPath2p3 concat 1:1 minus1
horizontalPath1p1 concat 0:33
horizontalPath1p2 concat 1:1 diffx
horizontalPath1p3 concat 0:33
horizontalPath2p1 concat 0:1 1:32
horizontalPath2p2 concat 1:1 diffx
horizontalPath2p3 concat 0:1 minus1
diagonalPath1p1 concat 0:1 diffy
diagonalPath1p2 concat 1:1 diffx
diagonalPath1p3 concat 0:33
diagonalPath2p1 concat 1:1 diffx
diagonalPath2p2 concat 0:1 diffy
diagonalPath2p3 concat 0:33
pickVertical equ diffx 0:32
pickHorizontal equ diffy 0:32
notPickDiagonal or pickVertical pickHorizontal
pickDiagonal not notPickDiagonal
avoidHorizontal equ startx avoidx
avoidVertical equ starty avoidy
pickVerticalPath2 and pickVertical avoidVertical
tempPickVerticalPath1 not pickVerticalPath2
pickVerticalPath1 and pickVertical tempPickVerticalPath1
pickHorizontalPath2 and pickHorizontal avoidHorizontal
tempPickHorizontalPath1 not pickHorizontalPath2
``` pickHorizontalPath1 and pickHorizontal tempPickHorizontalPath1
pickDiagonalPath1 and pickDiagonal avoidHorizontal
tempPickDiagonalPath2 not pickDiagonalPath1
pickDiagonalPath2 and pickDiagonal tempPickDiagonalPath2
pvp1l4 concat pickVerticalPath1 pickVerticalPath1 pickVerticalPath1 pickVerticalPath1
pvp1l33 concat pvp1l4 pvp1l4 pvp1l4 pvp1l4 pvp1l4 pvp1l4 pvp1l4 pvp1l4 pickVerticalPath1
pvp2l4 concat pickVerticalPath2 pickVerticalPath2 pickVerticalPath2 pickVerticalPath2
pvp2l33 concat pvp2l4 pvp2l4 pvp2l4 pvp2l4 pvp2l4 pvp2l4 pvp2l4 pvp2l4 pickVerticalPath2
php1l4 concat pickHorizontalPath1 pickHorizontalPath1 pickHorizontalPath1 pickHorizontalPath1
php1l33 concat php1l4 php1l4 php1l4 php1l4 php1l4 php1l4 php1l4 php1l4 pickHorizontalPath1
php2l4 concat pickHorizontalPath2 pickHorizontalPath2 pickHorizontalPath2 pickHorizontalPath2
php2l33 concat php2l4 php2l4 php2l4 php2l4 php2l4 php2l4 php2l4 php2l4 pickHorizontalPath2
pdp1l4 concat pickDiagonalPath1 pickDiagonalPath1 pickDiagonalPath1 pickDiagonalPath1
pdp1l33 concat pdp1l4 pdp1l4 pdp1l4 pdp1l4 pdp1l4 pdp1l4 pdp1l4 pdp1l4 pickDiagonalPath1
pdp2l4 concat pickDiagonalPath2 pickDiagonalPath2 pickDiagonalPath2 pickDiagonalPath2
pdp2l33 concat pdp2l4 pdp2l4 pdp2l4 pdp2l4 pdp2l4 pdp2l4 pdp2l4 pdp2l4 pickDiagonalPath2
temp1p1 and pvp1l33 verticalPath1p1
temp1p2 and pvp1l33 verticalPath1p2
temp1p3 and pvp1l33 verticalPath1p3
temp2p1 and pvp2l33 verticalPath2p1
temp2p2 and pvp2l33 verticalPath2p2
temp2p3 and pvp2l33 verticalPath2p3
temp3p1 or temp1p1 temp2p1
temp3p2 or temp1p2 temp2p2
temp3p3 or temp1p3 temp2p3
temp4p1 and php1l33 horizontalPath1p1
temp4p2 and php1l33 horizontalPath1p2
temp4p3 and php1l33 horizontalPath1p3
temp5p1 or temp4p1 temp3p1
temp5p2 or temp4p2 temp3p2
temp5p3 or temp4p3 temp3p3
temp6p1 and php2l33 horizontalPath2p1
temp6p2 and php2l33 horizontalPath2p2
temp6p3 and php2l33 horizontalPath2p3
temp7p1 or temp6p1 temp5p1
temp7p2 or temp6p2 temp5p2
temp7p3 or temp6p3 temp5p3
temp8p1 and pdp1l33 diagonalPath1p1
temp8p2 and pdp1l33 diagonalPath1p2
temp8p3 and pdp1l33 diagonalPath1p3
temp9p1 or temp8p1 temp7p1
temp9p2 or temp8p2 temp7p2
temp9p3 or temp8p3 temp7p3
temp10p1 and pdp2l33 diagonalPath2p1
temp10p2 and pdp2l33 diagonalPath2p2
temp10p3 and pdp2l33 diagonalPath2p3
temp11p1 or temp10p1 temp9p1
temp11p2 or temp10p2 temp9p2
temp11p3 or temp10p3 temp9p3
path1direction select temp11p1 32 33
path1length select temp11p1 0 32
path2direction select temp11p2 32 33
path2length select temp11p2 0 32
path3direction select temp11p3 32 33
path3length select temp11p3 0 32
.output path1direction
.output path1length signed
.output path2direction
.output path2length signed
.output path3direction
.output path3length signed (3.1.3) Security and Privacy In the system according to embodiments of the present disclosure, the universally composable security (see Literature Reference No. 3) in the honest-but-curious (HBC) adversary model was considered. The HBC adversaries are adversaries that follow the protocol instructions honestly, but desire to learn sensitive information about the other parties' private input from the execution of the protocol. In the HBC adversary model, the security of 2PC and MPC protocols needs care to make sure that even if two distinct protocols are executed, the security and privacy of the protocols are violated. At the high-level, the MPC protocol remains secure against any scheduling of protocol message transmission as long as at least the half of computation participants is honest. The only concern is the 2PC protocol, where there is no honest majority among the participants in the computation. The main observation for the proof of security of 2PC is that the security of generic 2PC protocol (based on Yao's garbled circuit (see Literature Reference No. 2)) is information-theoretic.

In order to evaluate Yao's garbled circuit, one must use oblivious transfer protocols. The universally composable oblivious transfer protocol (see Literature Reference No. 4) was used, which is known to exist relying on the existence of trapdoor random permutation, so that a party and cloud server perform this oblivious transfer protocol before the party transmits its garbled circuit. By leveraging the adversary's model (the HBC model) and the information theoretic property of the garbled circuit approach, one can prove the security of 2PC and MPC as a whole system in the HBC model by incorporating rewinding simulation strategy for 2PC and straight-line simulation strategy for MPC. Therefore, the entire system is proved to be secure and privacy-preserving against the HBC adversaries.

(3.1.4) Performance Evaluation and Prototype Results

To demonstrate the practicality of the system described herein that breaks down the computation into two parts one using 2PC and one using MPC to the privacy-preserving navigation use case, a pilot study was conducted, which addressed both route planning with location privacy and privacy-preserving updates to the map. FIGS. 6A-6C illustrate sample maps with a user's current location 600, destination 602, and a location to avoid 604. The location 604 is known to the cloud, but is not to be revealed to the user. Note that the opposite can also be enforced (i.e., the path has to go through some location(s) known to the cloud).

There are several possible shortest paths (with minimal turns and distance) from the user's current location to the destination. If the two points are on the same vertical or horizontal line, then the shortest path would be the straight path between them, but if some incident (element 604) exists on the straight path, the shortest path would be diverted slightly around the location 604. If the two points do not share a horizontal or vertical coordinate, there can be two "L-shaped" shortest paths. Given the location of any incidents, an illustrative Boolean circuit was designed that selects a path that avoids the incident locations unrevealed to the user. The circuit description in the intermediate language of Literature Reference No. 1 is approximately 150 lines and took about 1 day to write and test out.

The table in FIG. 7 lists the required times of computing navigation circuits with various input sizes. The inputs correspond to the coordinates on a map similar to FIGS. 6A-6C. For an input size of b bytes, the grid is of dimension $2^b \times 2^b$. FIG. 7 shows the performance of computing this navigation circuit with various input sizes. As one can see, even for a very large input size of 2,048 bits (e.g., a very large map), it only takes about 2.6 seconds for the vehicle and 3.4 seconds for the cloud to compute the route, and requires about 80,000 gates. Gates are logical functions to implement Boolean functions to perform logical operations (e.g., AND, OR gates). Each gate receives two inputs, and it has a single output. The gate is represented as a truth table such that for each possible pair of bits (those coming from the input wires' gate), the table assigns a unique output bit, which is the value of the output wire of the gate.

Once a path has been selected, the traffic conditions must be updated on the map in a privacy-preserving way without revealing individual paths. To update the traffic conditions, vehicles engage in a lightweight MPC that can scale to 10s of vehicles while collectively ensuring privacy protection for a large number of users. The following is a description of the computation. Each vehicle prepares a vector encoding the roads that it is traveling (in straight lines), and vehicles collectively find the union of their roads and update the map by revealing such a union to the cloud. Each vehicle may perform such a computation by secret-sharing its data and local additions over the shares, and by executing a small number of multiplications to compute whatever additional MPC functions are required to complete the computation as specified by the MPC protocol in use.

Figure 11:
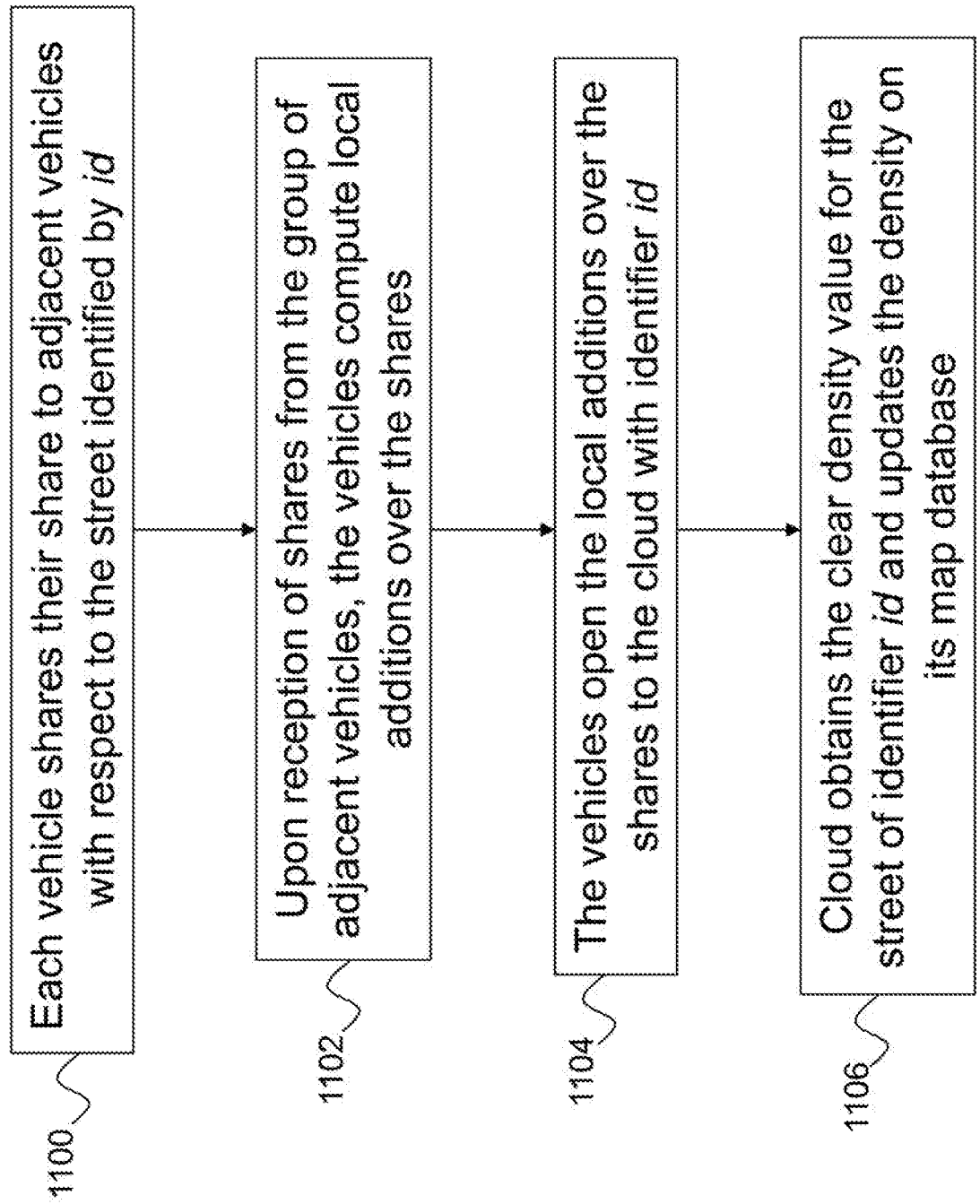
FIG. 11 is an illustration of computing a traffic density to update a traffic database according to some embodiments of the present disclosure.

The following is a lightweight MPC computation protocol (depicted in FIG. 11) for computing a traffic density on a street and updating the traffic database of clouds only relying on the addition over secret shares:
1. Each vehicle $V_i$ (in the local vehicular network consisting of n vehicles) shares their share $[s_i]$ to the adjacent vehicles with respect to the street identified by id such that $s_i=1$ if the vehicle is on the street. Otherwise, s=0 (element 1100).
2. Upon the receptions of shares $[s_i]$ from the group of adjacent vehicles, the vehicles locally compute $[s]=[s_1]+[s_2]+ \ldots +[s_n]$ (element 1102).
3. Then, vehicles open [s] to the cloud with identifier id (element 1104)
4. The cloud obtains the clear density value s for the street of identifier id and then updates the density on its map database (element 1106).

The above computation can be applied to compute other types of information of traffic, such as the computation of average speed of vehicles on streets. To compute average speed of vehicles on a street, each vehicle $V_i$ secret-shares their speed $s_i$ for $0 \leq s_i \leq 150$ (assuming that the maximum speed is 150 miles per hour), and then locally add them to obtain [s], where s is the sum of all $s_i$. Then, the vehicles jointly opens [s] to the cloud along with a value in clear, indicating the number n of vehicles participating in the computation. Then, cloud can compute the average speed by computing s/n and update the average speed of the corresponding street.

The table in FIG. 8 lists required pre-computation and online times of computing MPC circuits that have n+log n multiplication gates using MPC software running on a local cluster containing 90 physical nodes, where n is the number of participates in the MPC. FIG. 8 provides the time and communication bandwidth to compute circuits that contain tens of multiplication gates, which can be considered as an upper bound on the expected performance of such an MPC computation. As shown in the table, for 64 nodes, the total computations of 13 seconds is required to perform n+log n=70 multiplications. Note that this computation can be run in the background once the route has been revealed to the user.

Breaking up the privacy-preserving navigation (or similar planning or resource allocation or matching problems) task into a set or combination of computations to be privately performed in a sequence using 2PC and MPC is neither obvious nor straightforward. For example, such a division needs to be performed to break down the entire computation tasks into a combination of two classes: either a computation between a single car and a cloud or multiple cars involved in a computation together which then deliver their partial computation result to the cloud so that it can compute the final result.

Furthermore, designing a description of the computation to be privately performed as a circuit(s) for the 2PC portion of the overall task is not obvious. That is, given a private start and destination location and locations to go through or avoid, and a public (in the clear) map maintained in the cloud, how can a single entity (user, device, car) perform a computation with the cloud to get a route from source to destination location that satisfied certain conditions (e.g., avoid certain intersections, that are busy, or avoid, certain intersections at certain specified locations) without revealing to the cloud the start and destination location and such conditions?

In addition, using the MPC function/circuit to update the map is not obvious, and the trick here is to have the minimal number of multiplications in such a circuit (multiplications require parties involved in MPC to exchange a lot of information and that is the bottleneck in terms of performance) so that it can scale to hundreds or even thousands of users to ensure privacy (i.e., the cloud cannot look at the updates of the map and figure out the differences in them and from that deduce where a specific user is at and going to).

Ensuring privacy and security in the overall integration of 2PC and MPC is not obvious. If one uses a threshold-based lightweight algebraic MPC protocol as described herein, one leverages that such protocol by its nature can be safely composed (called Universally Composable Security, for short UC-security) with other types of protocols that have the identical security guarantees to the one of MPC. However, a generic UC-secure 2PC protocol is known to be infeasible in the plain model.

The framework according to embodiments of the present disclosure provides the general methods in the setting of multiple users and a cloud for the privacy-preserving cloud computation, which can be widely applied to searching, planning, scheduling and/or resource allocation in various environments, such as medical record cloud storage and vehicular information storage. Among the general applications, the invention is applicable for developing a privacy-preserving ground navigation system for connected vehicles (as described in detail herein). Such a navigation system can preserve users' location and route preference privacy when drivers use the vehicle's on-board navigation system.

Figure 9:
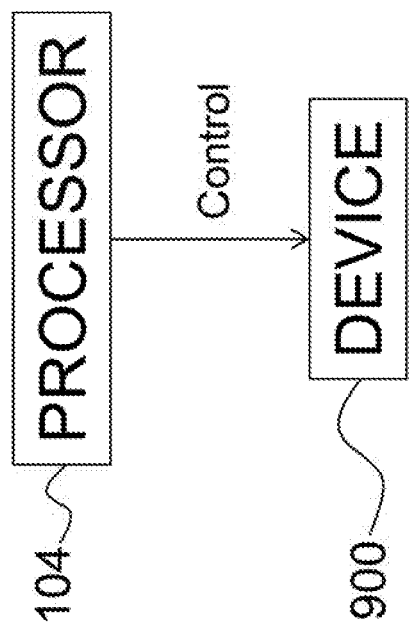
FIG. 9 is a flow diagram illustrating control of devices using a navigation result according to some embodiments of the present disclosure.

FIG. 9 is a flow diagram illustrating using a processor 104 to control a device 900 using the navigation result. Non-limiting examples of devices 900 that can be controlled via the processor 104 and the object categories include a motor vehicle or a motor vehicle component, such as a brake, a steering mechanism, suspension, or safety device (e.g., airbags, seatbelt tensioners, etc.). Further, the vehicle could be an unmanned aerial vehicle (UAV), an autonomous ground vehicle, or a human operated vehicle controlled either by a driver or by a remote operator. For instance, upon obtaining the navigation result, the system can cause the autonomous vehicle to perform a driving operation/maneuver (such as steering or another command) in line with driving parameters in accordance with the navigation result. For example, if the navigation result indicates that there is a vehicle accident along one route, the system can cause the autonomous vehicle to stop and turn around. The system can cause the autonomous vehicle to apply a functional response (or navigation operation), such as a braking operation followed by a steering operation, to redirect vehicle along an alternative route.

Other appropriate responses may include one or more of a steering operation, a throttle operation to increase speed or to decrease speed, or a decision to maintain course and speed without change. The responses may be appropriate for avoiding a collision, improving travel speed, or improving efficiency. As can be appreciated by one skilled in the art, control of other device types is also possible. Thus, there are a number of automated actions that can be initiated by the autonomous vehicle given the particular navigation result and the circumstances in which the system is implemented. For instance, if the navigation results obtains information regarding an empty parking spot in a parking garage, the system can cause the autonomous vehicle to accelerate and steer towards the open parking spot, where the navigation operations are increasing speed and steering the vehicle. In these examples, the navigation operations are vehicle maneuvers that are caused based on navigation results obtained by the system described herein.

Additionally, the invention can be used for a navigation application on a smartphone such that a smartphone users' location-relevant private information is preserved. Furthermore, the system according to embodiments of the present disclosure can protect the location-relevant confidentiality of military aircrafts or vehicles from enemies during a mission.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for cloud-based privacy-preserving navigation operations between multiple parties, the system comprising:
    one or more processors and a non-transitory computer-readable medium having executable instructions encoded thereon such that when executed, the one or more processors perform operations of:
        performing a two-party computation (2PC) between input data related to a current location of a first party and public data stored on a cloud computing infrastructure, wherein each party of the multiple parties individually performs a 2PC on the public data while maintaining privacy of input data;
        performing multi-party computations (MPC) between the multiple parties and the cloud computing infrastructure, where the multiple parties privately update the public data with a result obtained from the 2PC;
        generating a privacy-preserved navigation result for the first party from the first party's current location to a desired end location using results obtained from the 2PC and the MPC; and
        causing the first party to perform a navigation operation based on the privacy-preserved navigation result.

2. The system as set forth in claim 1, wherein the one or more processors perform an operation of performing the 2PC between input data from a vehicle and the cloud computing infrastructure for generating a route from a current location of the vehicle to the desired end location, wherein the current location of the vehicle, the desired end location, and the route from the current location of the vehicle to the desired end location are not revealed to the cloud computing infrastructure.

3. The system as set forth in claim 1, wherein the public data is a cloud-based map, and wherein the one or more processors perform an operation of performing privacy-preserving updates to the cloud-based map using MPC between the multiple parties.

4. The system as set forth in claim 1, wherein during the 2PC, each party of the multiple parties learns which party or parties to engage with in the MPC.

5. The system as set forth in claim 1, wherein the one or more processors further perform an operation of generating a cloud-based map for display on a mobile device associated with the first party, wherein the cloud-based map displays the privacy-preserved navigation result of the first party, and the privacy-preserved navigation result is not revealed to the cloud computing infrastructure.

6. The system as set forth in claim 1, wherein the public data comprises current traffic conditions, and wherein the MPC is used to update current traffic conditions in the public data.

7. The system as set forth in claim 1, wherein the navigation operation is a vehicle maneuver.

8. A computer implemented method for cloud-based privacy-preserving navigation operations between multiple parties, comprising an act of causing one or more processors to execute instructions stored on a non-transitory memory such that upon execution, the one or more processors perform operations of:
    performing a two-party computation (2PC) between input data related to a current location of a first party and public data stored on a cloud computing infrastructure, wherein each party of the multiple parties individually performs a 2PC on the public data while maintaining privacy of input data;
    performing multi-party computations (MPC) between the multiple parties and the cloud computing infrastructure, where the multiple parties privately update the public data with a result obtained from the 2PC;
    generating a privacy-preserved navigation result for the first party from the first party's current location to a desired end location using results obtained from the 2PC and the MPC; and
    causing the first party to perform a navigation operation based on the privacy-preserved navigation result.

9. The method as set forth in claim 8, wherein the one or more processors perform an operation of performing the 2PC between input data from a vehicle and the cloud computing infrastructure for generating a route from a current location of the vehicle to the desired end location, wherein the current location of the vehicle, the desired end location, and the route from the current location of the vehicle to the desired end location are not revealed to the cloud computing infrastructure.

10. The method as set forth in claim 8, wherein the public data is a cloud-based map, and wherein the one or more processors perform an operation of performing privacy-preserving updates to the cloud-based map using MPC between the multiple parties.

11. The method as set forth in claim 8, wherein during the 2PC, each party of the multiple parties learns which party or parties to engage with in the MPC.

12. The method as set forth in claim 8, wherein the one or more processors further perform an operation of generating a cloud-based map for display on a mobile device associated with the first party, wherein the cloud-based map displays the privacy-preserved navigation result of the first party, and the privacy-preserved navigation result is not revealed to the cloud computing infrastructure.

13. The method as set forth in claim 8, wherein the public data comprises current traffic conditions, and wherein the MPC is used to update current traffic conditions in the public data.

14. A computer program product for cloud-based privacy-preserving navigation operations between multiple parties, the computer program product comprising:
computer-readable instructions stored on a non-transitory computer-readable medium that are executable by a computer having one or more processors for causing the processor to perform operations of:
performing a two-party computation (2PC) between input data related to a current location of a first party and public data stored on a cloud computing infrastructure, wherein each party of the multiple parties individually performs a 2PC on the public data while maintaining privacy of input data;
performing multi-party computations (MPC) between the multiple parties and the cloud computing infrastructure, where the multiple parties privately update the public data with a result obtained from the 2PC;
generating a privacy-preserved navigation result for the first party from the first party's current location to a desired end location using results obtained from the 2PC and the MPC; and
causing the first party to perform a navigation operation based on the privacy-preserved navigation result.

15. The computer program product as set forth in claim 14, further comprising instructions for causing the one or more processors to perform an operation of performing the 2PC between input data from a vehicle and a cloud computing infrastructure for generating a route from the current location of the vehicle to the desired end location, wherein the current location of the vehicle, the desired end location, and the route from the current location of the vehicle to the desired end location are not revealed to the cloud computing infrastructure.

16. The computer program product as set forth in claim 14, wherein the public data is a cloud-based map, and wherein the one or more processors perform an operation of performing privacy-preserving updates to the cloud-based map using MPC between the multiple parties.

17. The computer program product as set forth in claim 14, wherein during the 2PC, each party of the multiple parties learns which party or parties to engage with in the MPC.

18. The computer program product as set forth in claim 14, further comprising instructions for causing the one or more processors to further perform an operation of generating a cloud-based map for display on a mobile device associated with the first party, wherein the cloud-based map displays the privacy-preserved navigation result of the first party, and the privacy-preserved navigation result is not revealed to the cloud computing infrastructure.

19. The computer program product as set forth in claim 14, wherein the public data comprises current traffic conditions, and wherein the MPC is used to update current traffic conditions in the public data.

* * * * *